United States Patent Office 3,497,592
Patented Feb. 24, 1970

3,497,592
USE OF s-RNA IN THE PREVENTION OF ANAEROBIC EMBARRASSMENT
Weldon B. Jolley, Redlands, Calif., assignor to Loma Linda University, Redlands, Calif., a corporation of California
No Drawing. Filed July 31, 1967, Ser. No. 657,091
Int. Cl. A61k 27/00
U.S. Cl. 424—180       5 Claims

ABSTRACT OF THE DISCLOSURE

This patent describes a method for the relief of anaeroboic embarrassment comprising administering to a mammal suffering from anaerobic metabolism in an organ or member thereof, an effective amount of s-ribonucleic acid.

This invention relates to the prevention of anaerobic embarrassment in mammals, including man, by the systemic use of s-ribonucleic acid.

Background of invention

Heretofore, it has been proposed to use crude ribonucleic acid in the form of intravenous injections in an attempt to improve the memory performance, orientation, and the like, in patients suffering from senility and other general manifestations of aging. In contrast thereto, the present invention is concerned with the use of s-ribonucleic acid to reduce or eliminate anaerobic embarrassment in a member or organ which for some reason is receiving an inadequate oxygen supply. The development of anaerobic embarrassment can occur at various times in the body as a consequence of certain disruptions in the oxygen supply to various parts or organs. For example, in the case of a coronary occlusion, there is a sudden anaerobic embarrassment of the effected area of the heart muscle. The more prolonged the period of anaerobic embarrassment of the heart muscle, the more extensive is likely to be the permanent damage to the organ. Similar situations arise in the case of endotoxin shock, a cerebral hemorrhage, or the rupture of an embolism, as well as various other edematous conditions caused by factors other than those already discussed. The present invention is concerned with the discovery that s-ribonucleic acid, when administered to a mammal suffering anaerobic embarrassment alleviates the oxygen deficiency, and thereby reduces the otherwise normal amount of damage due to the oxygen deficiency.

Accordingly, it is a principal object of the present invention to provide a novel method for relieving anaerobic embarrassment in various parts and organs of mammals.

More particularly, it is an object of the present invention to relieve anaerobic embarrassment in various parts and organs of human beings.

Still another object of the present invention is the systemic use in mammals including man of s-ribonucleic acid for shock, cardiac insufficiencies, and edematous conditions to reduce or eliminate anaerobic embarrassment.

These and other objects and advantages of the use of s-ribonucleic acid in accordance with my invention will become more apparent from the detailed description which follows.

Summary of invention

Briefly, the present invention comprises a method for the relief of anaerobic embarrassment in a mammal suffering oxygen deficiency, sometime referred to herein as anaerobic metabolism, by the administration thereto of an effective amount of s-ribonucleic acid.

While not bound by any theory it is believed that s-ribonucleic acid assists in the normal metabolism of the pyruvic acid formed in the metabolic process. It has been observed that during anaerobic metabolism, there tends to be a build-up of pyruvic acid as well as an increase in the production of lactic acid. In general, it is believed that the accumulation of these acids is strongly indicative of the fact that normal anaerobic metabolism is not taking place. I have observed that upon the administration of s-ribonucleic acid to that portion of a mammal undergoing anaerobic metabolism, the build-up of excess pyruvic acid and lactic acid, so-called acidosis is suppressed, indicating that the metabolic reactions are being promoted in the direction of the normal metabolism, i.e., that which would occur in the presence of sufficient oxygen. In other words, the s-ribonucleic acid seems to compensate for the deficiency of oxygen.

As will be immediately apparent to those skilled in the art, the present invention involving the administration of s-ribonucleic acid, will be of great benefit in the treatment of any organ or member of a mammal which is experiencing oxygen deficiency. The promotion of the chemistry of normal metabolism, even though there exists an oxygen insufficiency, will produce acidosis. Acidosis, of course, results in either temporary or permanent damage to the member or organ experiencing this condition, depending upon the duration. Thus, the use of s-ribonucleic acid avoids the damage caused by the development of acidosis in mammals.

Description of preferred embodiments

The method of administering the s-ribonucleic acid is not critical. Normally, it is administered in solution form, by intravenous injection, intramuscular injection, or subcutaneous injection. The administration of aqueous or saline solutions containing from 100 milligrams to 3.5 grams per day per patient is the most convenient means of administration. The s-ribonucleic acid is typically administered over periods ranging from 10 minutes to one hour at the rate of one to seven times per week.

In many cases, it is most preferable to administer the s-ribonucleic acid directly into the organ or member suffering oxygen embarrassment. Thus, for example, if a blood clot in a body member such as the leg is believed to be suffering from an oxygen shortage, according to the present invention, this condition may be relieved by the intravenous injection therein of an effective amount of s-ribonucleic acid. In many cases where the anaerobis embarrassment has become chronic due to, for example, constriction of the arteries due to arteriosclerosis, the patient may be put on a more or less permanent programmed dosage of s-ribonucleic acid to thereby eliminate the effects of oxygen deficiency. For this reason, the present invention may be of particular benefit in the treatment of angina pectoris.

The following experimental evidence is presented to show that the intravenous injection of soluble s-ribonucleic acid obtained in conventional manner from calf's liver is beneficial in preventing the build-up of pyruvic and lactic acid in animals during periods of anaerobic metabolism.

The s-ribonucleic acid has the following characteristics:

Moisture: 5–8% after 18 hrs. at 60° C.
Phosphorus: 6.5 to 7.8% (dry wt.)
Nitrogen: 13.5–15% (dry wt.)
Biuret: Negative
Physical: Off-white powder, hygroscopic aqueous solution: clear, straw color. Darkened on storage at room temperature.

The following examples are presented solely to illustrate the invention and should not be regarded as limiting in any way. In the examples, the parts and percentages are by weight unless otherwise indicated.

EXAMPLE 1

A lactic acid acidosis was produced by hemorrhaging 12 pairs of dogs to a pressure of 45 mm. Hg. This pressure was maintained for 5 hours or until 30% of the initial hemorrhaged volume was taken up to maintain a constant 45 mm. Hg pressure. The total volume was subsequently returned to the dog. One animal was given 400 mg. of soluble s-ribonucleic acid in saline, intravenously. The control animals were given either an equal volume of saline or an equal volume of saline containing an equal quantity of hydrolyzed soluble ribonucleic acid. Serum lactic acid and pyruvic acid levels were determined by conventional techniques familiar to those skilled in the art. The following results were observed:

|  | I | | II | | III | |
| --- | --- | --- | --- | --- | --- | --- |
|  | Lactic | Pyruvic | Lactic | Pyruvic | Lactic | Pyruvic |
| Saline control | 1.58 | .037 | 9.28 | .139 | 9.11 | .137 |
| Hydrolyzed s-ribonucleic acid | 1.74 | .037 | 12.20 | .174 | 16.20 | .174 |
| s-Ribonucleic acid | 1.59 | .039 | 5.58 | .079 | 3.76 | .061 |

I—Baseline values.
II—Values at end of five hour period.
III—Values at end of retransfusion of blood from initial hemorrhage.

EXAMPLE 2

Two dogs were hemorrhaged to 45 millimeters of mercury. The one dog (R) received 400 mg. of s-ribonucleic acid and the control dog received no s-ribonucleic acid. The following data were obtained:

R DOG

| Time | Hematocrit, percent | pH | Cardiac output, cc./min. | Central venous pressure, mm./Hg. | Blood pressure, mm./Hg |
| --- | --- | --- | --- | --- | --- |
| Baseline | 44 | 7.47 | 3,394 | −1 | 140 |
| ½ | 38 | 7.30 | 508 | −3 | 45 |
| 1 | | | | −3 | 45 |
| 1½ | 34 | 7.35 | 614 | −3 | 45 |
| 2 | | | | −3 | 45 |
| 2½ | 35 | 7.33 | 483 | −3 | 45 |
| 3 | | | | −3 | 45 |
| 3½ | 33 | 7.34 | 607 | −3 | 45 |
| 4 | | | | −4 | 45 |
| 4½ | 35 | 7.33 | 748 | −4 | 50 |
| 5 | | | | −4 | 50 |
| 5½ | 45 | 7.30 | 2,572 | −4 | 50 |

CONTROL DOG

| Time | Hematocrit, percent | pH | Cardiac output, cc./min. | Central venous pressure, mm./Hg. | Blood pressure, mm./Hg |
| --- | --- | --- | --- | --- | --- |
| Baseline | 50 | 7.49 | 2,964 | −1 | 200 |
| ½ | 40 | 7.34 | 292 | −4 | 45 |
| 1 | | | | −4 | 45 |
| 1½ | 36 | 7.24 | 316 | −4 | 45 |
| 2 | | | | −4 | 45 |
| 2½ | 37 | 7.14 | 311 | −4 | 45 |
| 3 | | | | −4 | 45 |
| 3½ | 38 | 7.04 | 356 | −4 | 45 |
| 4 | | 7.04 | Retransfusion | | 45 |
| 4½ | 45 | 7.04 | 2,271 | −1.5 | 70 |
| 5 | | | | 0 | 150 |
| 5½ | 50 | 7.08 | 1,336 | 0 | 150 |

Results: the R dog was retransfused after 5 hours and the control dog after 4 hours. The R dog lived, the control dog died.

EXAMPLE 3

Dog R receiver 200 mg. s-ribonucleic acid and 20 cc. of saline solution intravenously 30 minutes prior to bleeding. The R dog and Control dog were each bled to 45 mm./Hg and remained there for 5 hours at which time 200 mg. s-ribonucleic acid in 20 cc. saline solution was injected just prior to retransfusion. The initial lactic acid and pyruvic acid levels were measured, these measurements were repeated just prior to retransfusion and again one hour after retransfusion. The same procedure was followed on the control dog, except that hydrolyzed ribonucleic was utilized in lieu of the s-ribonucleic acid. The following data were obtained:

R DOG

| Time | Hematocrit, percent | pH | Lactic acid | Pyruvic acid | Blood pressure, mm./Hg |
| --- | --- | --- | --- | --- | --- |
| Baseline | 45 | 7.28 | 1.26 | 0.032 | 145 |
| ½ | | | | | 45 |
| 1 | 45 | 7.25 | | | 45 |
| 1½ | | | | | 45 |
| 2 | 45 | 7.14 | | | 45 |
| 2½ | | | | | 45 |
| 3 | 45 | 7.14 | | | 45 |
| 3½ | | | | | 45 |
| 4 | 45 | 7.17 | | | 45 |
| 4½ | | | | | 45 |
| 5 | 45 | 7.15 | 2.92 | 0.051 | 70 |
| 5½ | | Retransfusion | | | 70 |
| 6 | 45 | 7.12 | 3.75 | 0.059 | 100 |

CONTROL DOG

| Time | Hematocrit, percent | pH | Lactic acid | Pyruvic acid | Blood pressure, mm./Hg |
| --- | --- | --- | --- | --- | --- |
| Baseline | 28 | 7.29 | 1.74 | 0.037 | 110 |
| ½ | | | | | 45 |
| 1 | 28 | 7.28 | 2.15 | 0.049 | 45 |
| 1½ | | Retransfusion | | | 45 |
| 2 | 30 | 7.28 | | | 45 |
| 2½ | | | | | 45 |
| 3 | 25 | 7.10 | | | 30 |
| 3½ | | | | | 35 |
| 4 | | 6.95 | 16.20 | 0.174 | 0 |
| 4½ | | Died—4 hours | | | |

Results: The R dog lived and the control dog died after 4 hours.

The foregoing data clearly indicate that s-ribonucleic acid effectively reduces the amount of pyruvic and lactic acid present in a system undergoing anaerobic metabolism. This clearly indicates that s-ribonucleic acid is effective in eliminating the normal effects of oxygen deficiency. On this basis then it is apparent that s-ribonucleic acid will aid in preventing acidosis and other undesirable consequences of anaerobic metabolism.

While the foregoing data establish the efficacy of the use of s-ribonucleic acid in alleviating the effects of anaerobic metabolism in dogs, the same results are to be expected in human beings and other mammals since the chemistry of metabolism is in all cases quite similar. Accordingly, all such usages of s-ribonucleic acid to alleviate the effects of anaerobic embarrassment in any type of mammal is within the contemplation of the present invention.

I claim:

1. A method for the relief of anaerobic embarrassment comprising administering by injection to a mammal suffering from anaerobic metabolism in an organ or member thereof, an effective amount of s-ribonucleic acid.

2. A method for the relief of anaerobic embarrassment comprising administering by injection to a human being suffering from anaerobic metabolism in an organ or member thereof, an effective amount of s-ribonucleic acid.

3. The method of claim 1 wherein the s-ribonucleic acid is administered in the form of an aqueous solution.

4. The method of claim 1 wherein the s-ribonucleic acid is administered in the form of a saline solution.

5. The method of claim 1 wherein the administration is by intravenous injection of a solution containing from 0.1 to 5% by weight of s-ribonucleic acid.

References Cited

UNITED STATES PATENTS 3,389,133   6/1968   Gutcho _____ 260—211.5

OTHER REFERENCES

Cameron, D. E., et al.: American Journal of Psychiatry, vol. 120, pp. 320–325 (1963).

ALBERT T. MEYERS, Primary Examiner

S. J. FRIEDMAN, Assistant Examiner